United States Patent [19]
Fontana

[11] Patent Number: 6,054,950
[45] Date of Patent: Apr. 25, 2000

[54] ULTRA WIDEBAND PRECISION GEOLOCATION SYSTEM

[75] Inventor: Robert J. Fontana, Rockville, Md.

[73] Assignee: Multispectral Solutions, Inc., Gaithersburg, Md.

[21] Appl. No.: 09/013,667

[22] Filed: Jan. 26, 1998

[51] Int. Cl.[7] ...................................................... G01S 3/02
[52] U.S. Cl. .......................................... 342/463; 342/464
[58] Field of Search ................................... 342/463, 464, 342/357.09

[56] References Cited

U.S. PATENT DOCUMENTS

| | | | |
|---|---|---|---|
| 3,150,372 | 9/1964 | Groth, Jr. ................................. | 342/464 |
| 5,317,323 | 5/1994 | Kennedy et al. ........................ | 342/457 |
| 5,506,587 | 4/1996 | Lans ......................................... | 342/357 |
| 5,510,800 | 4/1996 | McEwan ................................... | 342/387 |
| 5,661,490 | 8/1997 | McEwan ................................... | 342/387 |
| 5,661,492 | 8/1997 | Shoap et al. ............................. | 342/465 |
| 5,748,147 | 5/1998 | Bickley et al. .......................... | 342/457 |

*Primary Examiner*—Mark Hellner
*Attorney, Agent, or Firm*—Kile McIntyre & Harbin

[57] ABSTRACT

An ultra wideband (UWB) or short-pulse transmission system that enables precise tracking or geolocation of a target over distances of several kilometers. The system includes a set of N (where N>2) untethered UWB transceivers located at fixed positions, an untethered UWB receiver at the target, and a processor at the target for resolving time-of-flight measurement ambiguities of received pulses to determine precise geolocation by solving a set of equations according to time-of-flight measurements and surveyed positions of N−1 transceivers. To eliminate a clock distribution system, self-synchronizing of pulse timing is achieved by generating a start pulse at one of the untethered transceivers. Alternatively, a timing source may be provided by a GPS or other timing generator at the transceivers in order to synchronize emissions of their pulses.

21 Claims, 5 Drawing Sheets

ULTRA WIDEBAND PRECISION GEOLOCATION SYSTEM

BACKGROUND OF THE INVENTION

1. Field of the Invention

This invention relates to ultra wideband (UWB) precision geolocation. More particularly, the invention relates equipment and methods for attaining reliable transmission, reception and processing of ultra wideband electromagnetic pulses, over distances as great as several kilometers, to determine precise (centimeter-accurate) position measurements of a mobile platform.

2. Background of Related Art

Ultra wideband waveforms have been used to achieve extremely fine, centimeter-type resolutions because of their extremely short (subnanosecond to nanosecond) durations. With the advent of very high speed, high sensitivity detectors (see, for example, U.S. Pat. No. 5,901,172 to Fontana and Larrick, entitled ULTRA WIDEBAND RECEIVER WITH HIGH SPEED NOISE AND INTERFERENCE TRACKING THRESHOLD, incorporated herein by reference), the feasibility of such systems has been demonstrated. Applications of UWB-based radar and time domain reflectometry have included such diverse fields as high resolution radar altimetry, liquid level sensing, collision and obstacle avoidance, etc.

With the ability to achieve range resolutions at centimeter levels (time-of-flight measurements to better than a few tens of picoseconds), UWB can also be used to provide a precise geolocation capability similar to that achieved with real time kinematic (RTK) GPS solutions. In the absence of adequate satellite coverage (e.g., operation under jungle canopies, near various RF obstructions such as mine walls, non-ideal solar flux levels, areas of poor satellite visibility, etc.), such a wireless UWB solution can augment or even replace conventional RTK-based GPS systems. In the complete absence of satellite coverage due to military shut down during war time or satellite failures, the need for a remote system becomes even more compelling.

In GPS-based rapid-static and kinematic positioning systems, measurement ambiguity is resolved by converting ambiguous carrier-phase measurements into unambiguous ranges. With the UWB-based positioning system described here, ambiguous arrival time-differences are converted into unambiguous ranges. This may be described as the time-domain "dual" of the carrier-phase approach, and permits operation under a wide variety of circumstances for which GPS coverage is either unavailable or seriously degraded.

In the prior art, short pulse (impulse), baseband or ultra wideband (UWB) waveforms have been proposed to determine the relative position of a platform or target for such applications as ship docking (Ross, U.S. Pat. No. 4,510,496), precision radar ranging for intrusion detection and alert systems (Woolfolk, U.S. Pat. No. 5,148,175), speed and motion sensors (Mara, Nicolson and Ross, U.S. Pat. No. 4,152,701; McEwan, U.S. Pat. No, 5,361,070); target range detection of slowly moving targets (Henning and Woolfolk, U.S. Pat. No. 5,049,887), liquid level sensing (Rama and Robbins, U.S. Pat. No. 4,489,601), and others. In each of these patents, only the relative position of the target with respect to a fixed position was of interest, with distance to the target being the primary measurement to be performed.

In addition, Japanese Application No. 5-223916 describes a sonar-based position measuring system for underwater use. Japanese Patent Application No. 61-14584 discloses an RF system for measuring the remote position of an object using plural spatially located transmitters and receivers. Japanese Application No. 64-31077 describes a position measurement system using time-of-arrival measurements and an independent synchronizing source wherein the transmitted signals apparently comprise conventional RF emissions. UK Patent Application GB 2254508A also discloses a location determination system that employs time-of-arrival computations to determine position.

However, there has also been interest in the use of ultra wideband signals for the determination of the absolute position of an object:

For example, in McEwan (U.S. Pat. No. 5,510,800), a very short range (<10 ft.) time-of-flight radio location system was described. In the suggested implementation, a single UWB transmitter is used with a multiplicity of UWB receivers to determine a set of time-of-flight measurements from which absolute positional information can be computed provided the absolute locations of each UWB receiver can be measured a priori. Timing information for McEwan's UWB positioning system was derived locally and distributed electrically (via cables) to the transmitter and associated receiver units. The primary limitation of such a system is the need for accurate clock distribution with tightly controlled skew (i.e., the difference in times of arrival between pulses sent along different cables). Thus, such a system necessitates the use of a set of precision cables (or, as a minimum, a set of cables having known or accurately measured group delays). As a consequence, as pointed out by McEwan, the applicability of such an approach is limited to very short distances for which the time-of-flight measurements are less than ten nanoseconds (i.e., range less than ten feet).

In McEwan (U.S. Pat. No. 5,589,938), another short range radio locator system is described in which a single transmitter and multiplicity of receivers is again used to obtain precision absolute positioning information. In this approach, however, one of the receivers is used to electrically provide a synchronizing gating pulse to itself and to the other receivers. The data output from each receiver is, in turn, sent to the synchronizing receiver's processor (CPU) with which the absolute position of the roving transmitter is calculated. In this case, in addition to a set of carefully measured or calibrated cables (for precision clock distribution), additional cabling must be provided between the receivers for the relay of measured time-of-flight data for position computation. Unlike the system of U.S. Pat. No. 5,510,800, McEwan adopts an untethered transmitter, but still utilizes a set of interconnected, cabled receiver units. Such an approach thus limits the achievable range over which the system can effectively (and economically) operate, e.g., to only a few meters.

For many applications of practical interest, it is essential that all equipment be untethered; i.e., no physical wires or cables between transmitters, receivers, or to a central processor or CPU. In this fashion, the range over which precision geolocation can be achieved is limited only by the ranges over which reliable communications can be established between units. For ultra wideband detectors with sensitivities as described in incorporated U.S. application Ser. No. 08/872,729 mentioned above, these ranges can be several kilometers, permitting the use of such a system for the augmentation or replacement of more conventional GPS RTK precision geolocation systems.

In addition, to achieve untethered operation over distances of several hundred meters to kilometers, it is essential that wireless transmissions be used to allow individual units to be precisely time synchronized. This obviates the need for costly cables and the associated high costs of installation and maintenance.

SUMMARY OF THE INVENTION

In view of the foregoing, it is a general object of the present invention to provide ultra wideband or pulse transmission systems and methods for measuring and/or detecting the position or presence of an object.

It is a more specific object of the present invention to provide ultra wideband-based systems and methods that operate over ranges exceeding one kilometer and that provide precision measurement information for geolocating a target, object or platform within a centimeter or less.

It is a further object of the present invention to achieve such precision geolocation without the use of any tethered, or cabled, equipment.

It is a further object of the invention to provide a method of self-synchronization for pulse transmission wireless equipment to eliminate the need for additional cabling between units and a central processor unit (CPU).

It is a further object of certain aspects of the present invention to provide an pulse transmission position measuring system including a system that employs self-synchronizing timing signals thereby obviating the need to use an external timing source for determining the position of an object.

It is a further object of the present invention to permit either the complete replacement of, or the augmentation of, a conventional GPS or RTK GPS precision geolocation system.

In accordance with an embodiment of the present invention, a precision geolocation system comprises a set of untethered, wireless ultra wideband transceivers positioned at precisely surveyed stationary positions, and an untethered ultra wideband receiver/processor located at the point in space (e.g., a movable object, target or platform) whose absolute spatial coordinates are to be measured or detected wherein the processor resolves the position of the point in space based on the coordinates of the fixed points and time-of-flight measurements of the ultra wideband pulse. Since resolution calculations involve solving an unknown using n equations and n−1 unknowns, other embodiments include systems and methods for performing geolocation with respect to any one of the fixed or mobile points provided the others are known. In addition, the processor may resolve point location in terms of absolute position (e.g., relative to earth coordinates) or relative to the position of other known points.

In a more specific embodiment, the system and method utilizes a self-synchronizing scheme that makes time-of-flight measurements based on an initiation pulse generated at any one of the mobile or stationary reference points. In another embodiment, an external timing source is used for determining pulse arrival times at the mobile or stationary reference points.

Other aspects, features and embodiments of the invention will become readily apparent to those of ordinary skill in the art upon review of the detailed description of the exemplary embodiments with reference to the accompanying drawings. The invention, though, is pointed out with particularity by the appended claims.

DESCRIPTION OF ILLUSTRATIVE EMBODIMENTS

Figure 1:
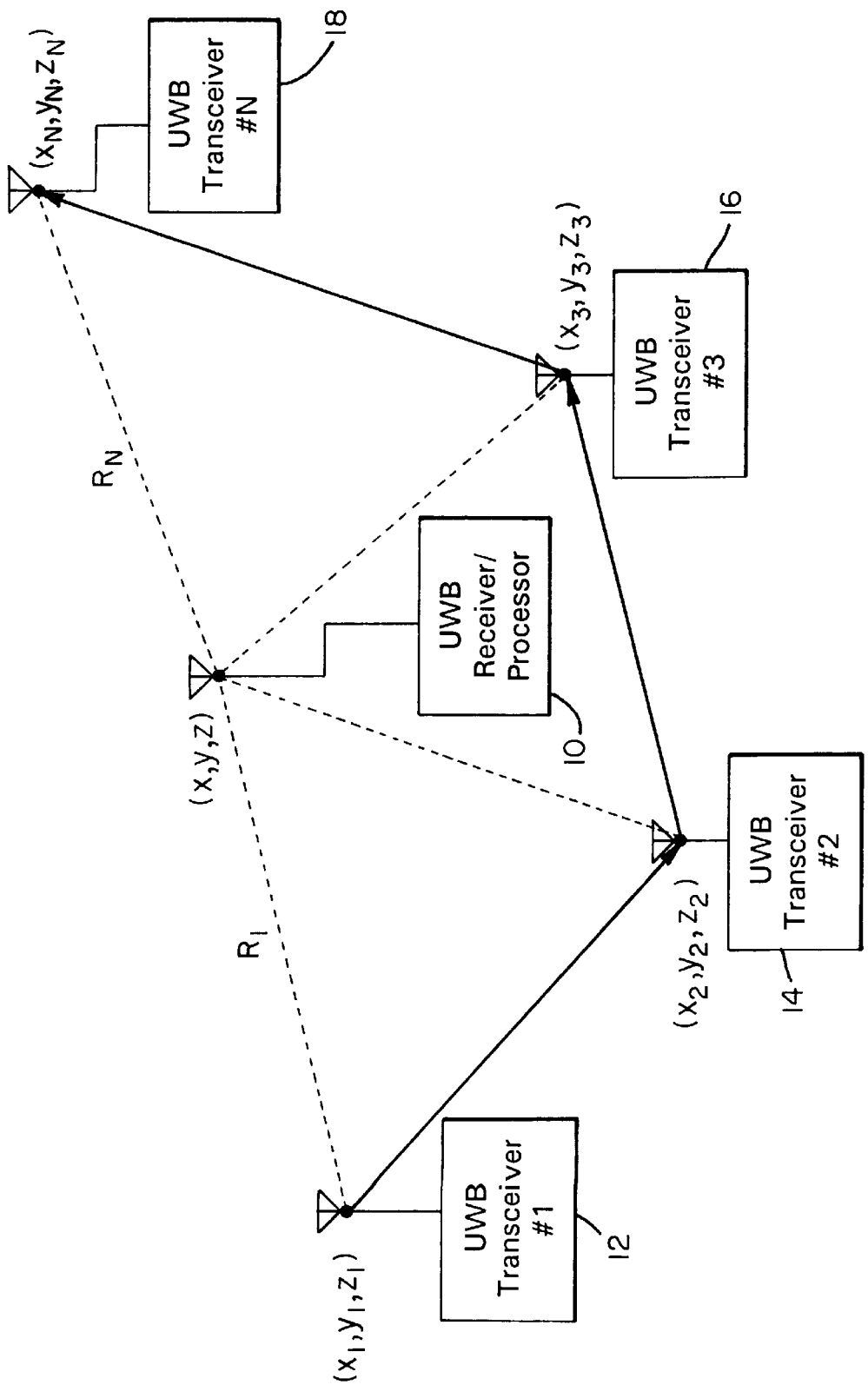
FIG. 1 is a block diagram of a differential time-of-arrival or time-of-flight precision geolocation system using a collection of N UWB transceivers and a single (roving) UWB receiver/processor.
Figure 2:
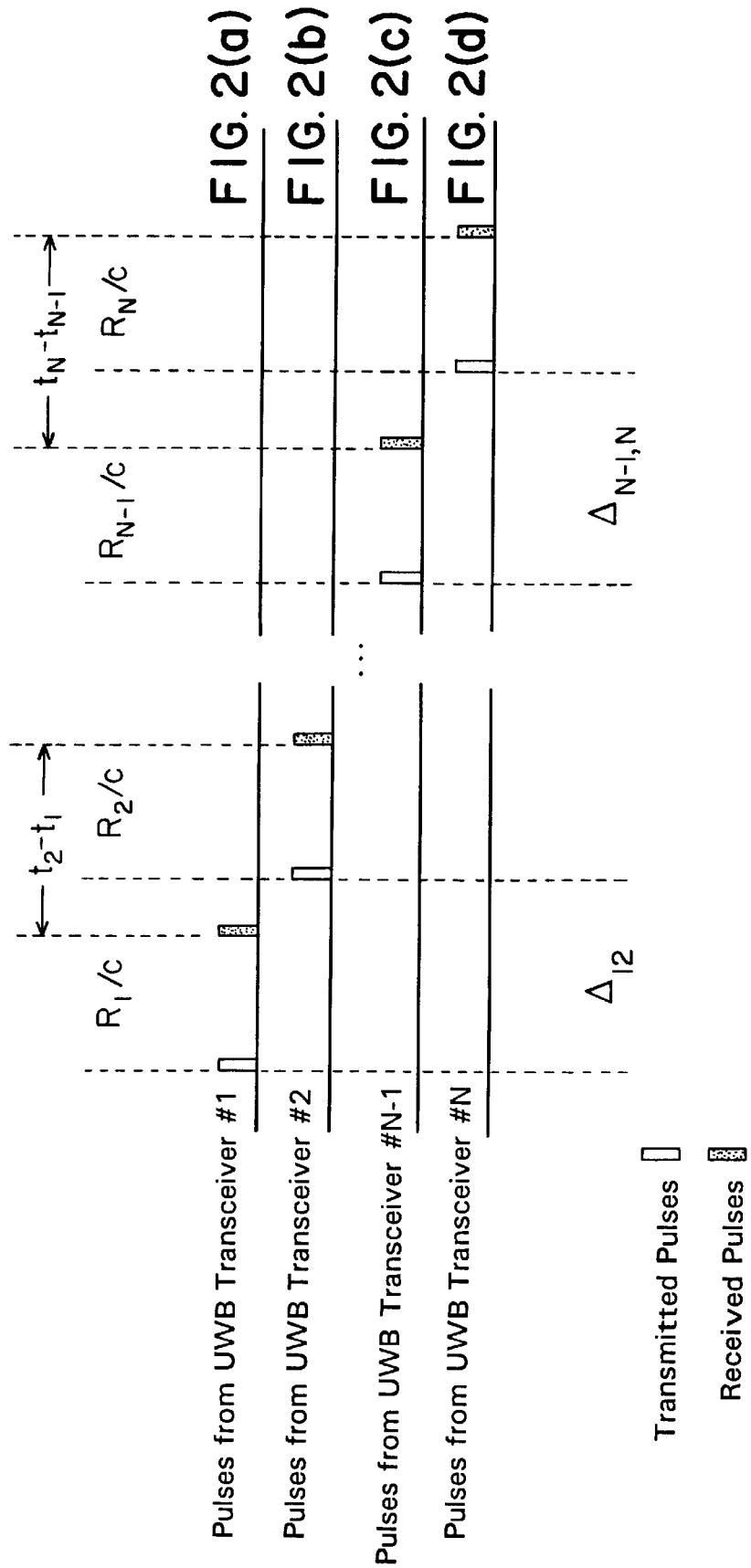
FIG. 2(a) through 2(d) are timing diagrams showing the relationships between respective sets of transmitted and received pulses at fixed stations by which precision geolocation or measurement is performed.

FIG. 1 illustrates a basic concept of a self-synchronizing UWB precision geolocation system for precisely measuring the position of a mobile object, such as a vehicle or platform. An illustrative embodiment of the invention utilizes a set of N stations 12, 14, 16 and 18 having N previously surveyed, fixed positions which were determined using, for example, RTK techniques in order to accurately measure the x,y,z position of a station 10, such as a terrestrial, subterranean or extraterrestrial vehicle, platform or object subject to mobility. The accuracy to which the fixed positions of stations 12–18 is measured will directly affect the resulting accuracy of position measurements of station 10. This is true both for GPS-based RTK and UWB-based solutions. The reference locations of stations 12–18 can be selected to provide favorable siting for mobile station 10 whose position is to be determined.

As used herein, positioning or location measurement also includes guidance and/or tracking of an object, target or platform. Further, ultra wideband pulses include short bursts of electromagnetic energy, such as those used in pulse transmission systems where the energy pulse is of such duration to attain the desired measuring or positioning resolution for object detection.

Measurement proceeds as follows. Each station 12 through 18 has predetermined coordinates $x_N$, $y_N$, $x_N$ which are separated from coordinates x,y,z of station 10 by distance $R_N$, where $R_1$ is the distance between stations 10 and 12, $R_2$ is the distance between stations 10 and 14, and $R_3$ is the distance between stations 10 and 16. Ultra wideband (UWB) transceiver #1 at fixed station 12 initiates a radio frequency (RF) burst of electromagnetic energy which is received both at the UWB transceiver of station 10 and UWB transceiver #2 of fixed station 14. Since the exact positions of stations 12 and 14 are known, a priori, a conventional data processor or time difference circuitry associated with transceiver #2 determines the exact time of transmission of the pulse emitted by transceiver #1 based on knowledge of the time of arrival of the pulse (as measured by a precision UWB detector) and the transit time for the pulse to reach the detector, which is given by R12/c. Here, Rij is the distance between UWB transceiver units #i and #j, and c is the speed of pulse propagation (e.g., the speed of light for transmission in free space).

Now, knowing the precise time of transmission of a pulse from UWB transceiver #1, a data processing device or timing circuit at UWB transceiver #2 waits a predetermined time (chosen to avoid collision of pulses received by the UWB receiver/processor of station 10) and transmits its own pulse. As before, this pulse is received by both the receiver/processor at station 10 and the UWB transceiver #3 of station 16.

To avoid the possibility that other units will receive the pulse emitted from station 14 and erroneously assume that it was transmitted by transceiver #i−1, the "single" pulse can be replaced by a pulse train consisting of a synchronization burst and additional data identifying the source of transmission—e.g., unit serial ID. In general, UWB transceiver #i receives a pulse (or coded pulse train) from UWB transmitter #(i−1) and broadcasts a successive transmission after a fixed interval of time from the computed transmission time for the received pulse (i.e., after removing propagation delays via knowledge of position). At the predetermined surveyed position, the UWB receiver/processor of station 10 has now received pulses (or coded pulse trains) from each of the N UWB transceivers.

The exact time at which the first pulse from UWB transceiver #1 of station 12 is transmitted is unknown, however, the differential propagation times—i.e., the difference in time for a pulse to arrive from UWB transmitter #(i+1) and UWB transmitter #i can be readily measured. From these measurements, the differential propagation distances can be determined as indicated in FIGS. 2(a) through 2(d) which show time instances of transmitted and received pulse pairs at UWB transmitter #1, #2, #N−1 and #N, respectively. In FIGS. 2(a) through 2(d), received pulses are shaded while transmitted pulses are not shaded.

According to FIGS. 2(a) through 2(d), it is observed that:

$$\Delta_{12} + \frac{R_2}{c} = \frac{R_1}{c} + (t_2 - t_1)$$

$$\Delta_{23} + \frac{R_3}{c} = \frac{R_2}{c} + (t_3 - t_2)$$

$$\ldots$$

$$\Delta_{N-1,N} + \frac{R_N}{c} = \frac{R_{N-1}}{c} + (t_N - t_{N-1})$$

where distance $\{\Delta i,j\}$ and time differential $\{ti-tj\}$ are either known or measurable quantities. Note from these equations that it is only the short term stability of the oscillators at each UWB transmitter which is of concern, since the transceiver clocks are effectively resynchronized at each burst. In addition, since a high speed UWB receiver can be designed to achieve much better than 100 ps response time to an UWB transmitted pulse (see, for example incorporated U.S. Pat. No. 5,901,172 to Fontana and Larrick, time synchronization can be made extremely precise to achieve centimeter-type resolution in geolocation from distances of several kilometers.

From these relationships, one obtains that:

$$R_2 - R_1 \equiv ((x-x_2)^2 + (y-y_2)^2)^{\frac{1}{2}} - \qquad (*)$$
$$((x-x_1)^2 + (y-y_1)^2)^{\frac{1}{2}} = c_{12}$$
$$R_3 - R_2 \equiv ((x-x_3)^2 + (y-y_3)^2)^{\frac{1}{2}} -$$
$$((x-x_2)^2 + (y-y_2)^2)^{\frac{1}{2}} = c_{23}$$
$$\ldots$$
$$R_N - R_{N-1} \equiv ((x-x_N)^2 + (y-y_N)^2)^{\frac{1}{2}} -$$
$$((x-x_{N-1})^2 + (y-y_{N-1})^2)^{\frac{1}{2}} = c_{N-1,N}$$

where $\{(x_i,y_i)\}$ are the coordinates of the fixed sites 12–18 (FIG. 1), (x,y) are the coordinates of the mobile station 10 (FIG. 1) to be determined, and $\{c_{i,j}\}$ are measured constants determined from the differential times of arrival at station 10 and the fixed site coordinate data, e.g., position reference points. (Note: three-dimensional coordinate positions can also be determined by solving the above set of equations using a three-dimensional Euclidean distance.)

Figure 3:
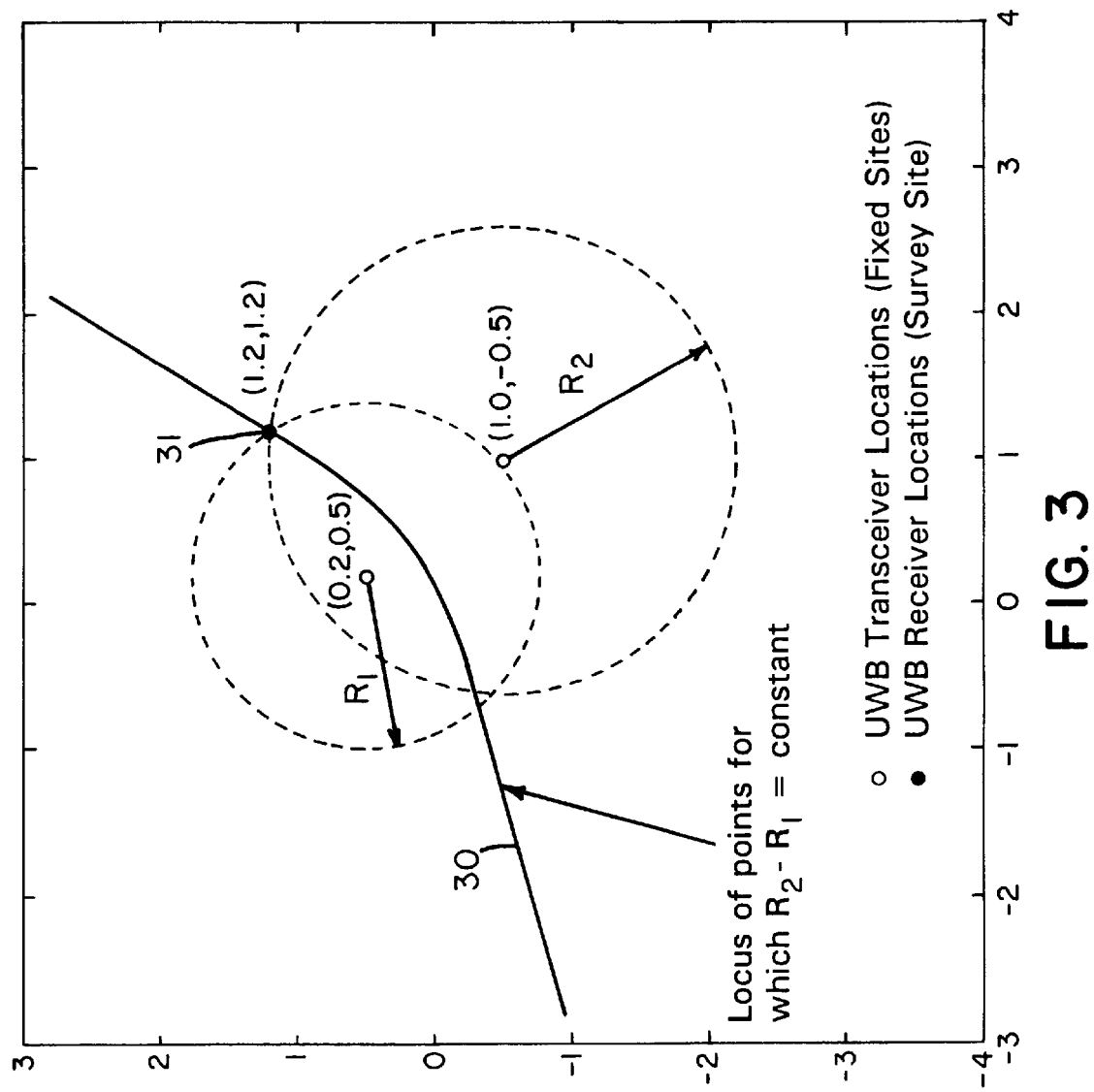
FIG. 3 illustrates an ambiguity locus for a system consisting of a set of only two UWB transceivers and points out the need for a minimum of three UWB transceivers to resolve position ambiguity.

Note that for two transmitters, the single equation $$R_2-R_1 \equiv ((x-x_2)^2+(y-y_2)^2)^{1/2}-((x-x_1)^2+(y-y_1)^2)^{1/2}=c_{12}$$

provides a continuum of possible (x,y) coordinates as illustrated in FIG. 3 which show an ambiguity locus 30 for two UWB transceivers defining points for which $R_1-R_2$ is constant. In FIG. 3, the solid point represent a mobile target (e.g., station 10 (FIG. 1)) while unshaded points represent a fixed station. The x,y coordinates of point 31 is geolocated at 1.2,1.2 based distances $R_1$ and $R_2$ having x,y coordinates 0.2,0.5 and 1.0,0.5, respectively.

Figure 4:
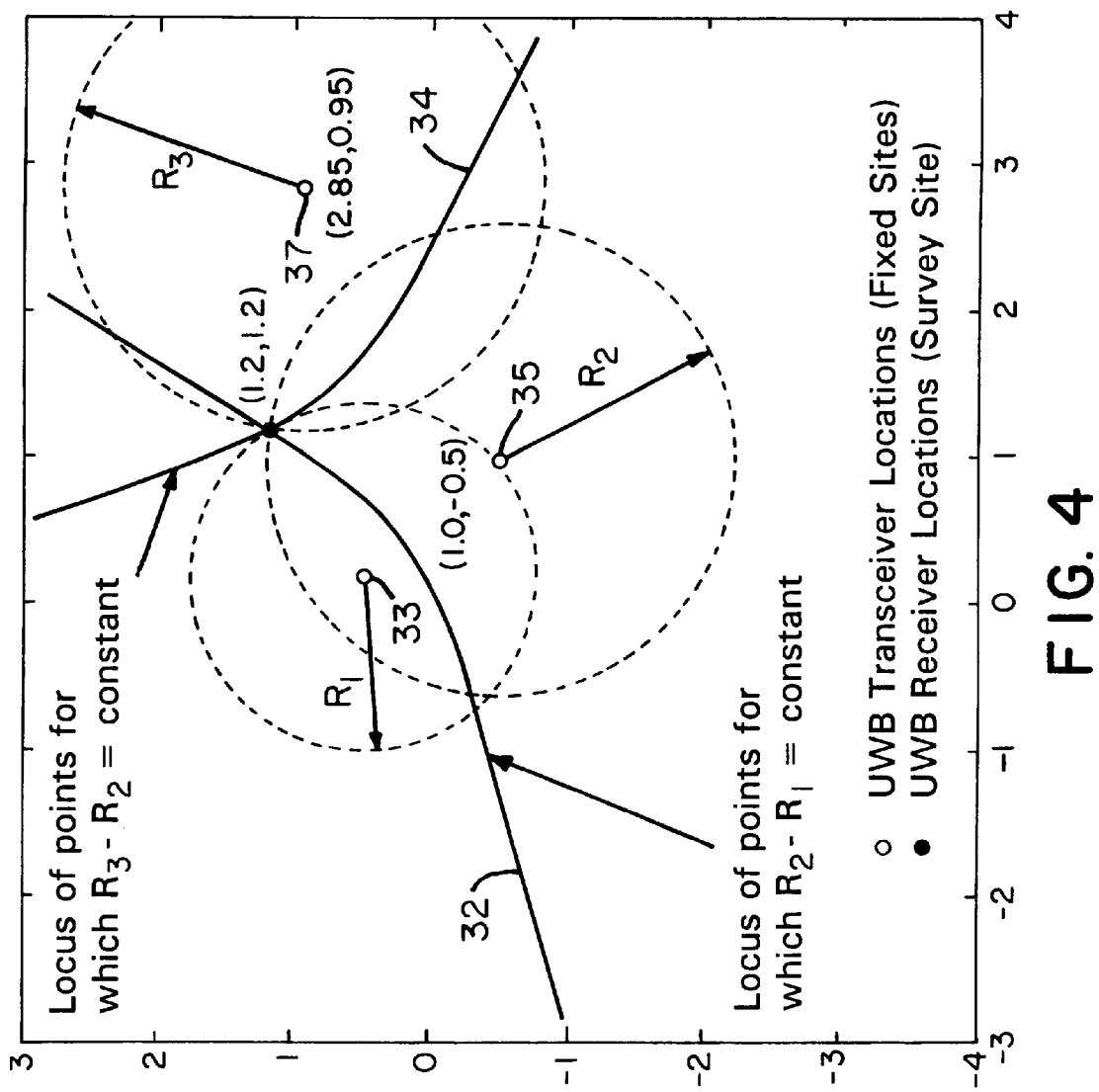
FIG. 4 illustrates an ambiguity locus for a system containing a minimum of three UWB transceivers and demonstrates the manner in which ambiguity is resolved with only relative timing information and represents the time-domain dual of the carrier-phase RTK GPS technique; and resolution of the z-axis (vertical height) may permit use in applications where height or altitude is necessary (e.g., aircraft landing). The imprecise measurement of height is a known limitation of GPS-based systems.
Figure 5:
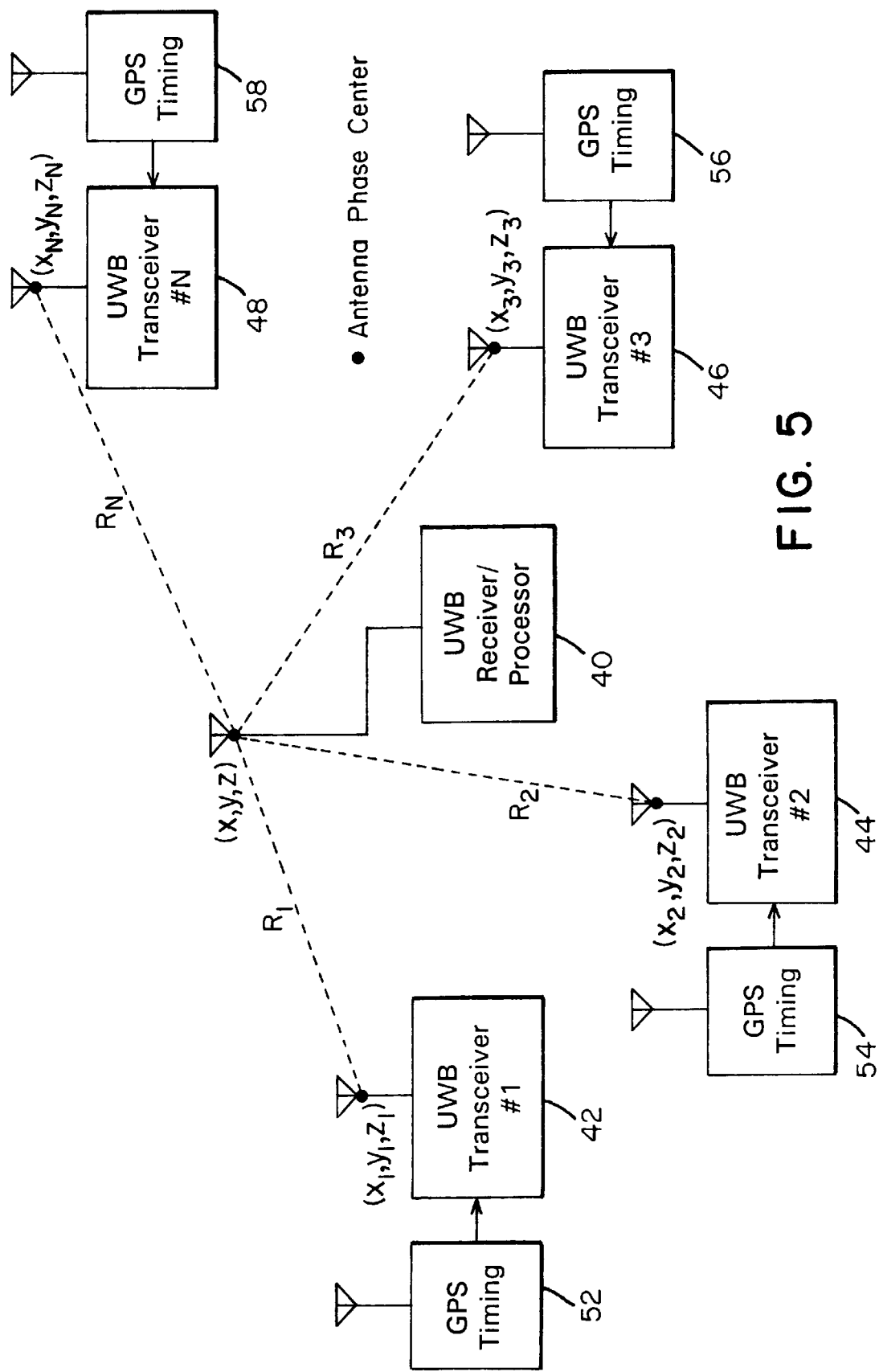
FIG. 5 is a block diagram of a differential time-of-arrival or time-of-flight precision geolocation system using a collection of N UWB transmitters, individually synchronized by GPS timing information, and a single (roving) UWB receiver/processor.

Likewise, with three properly placed UWB transceivers at fixed locations 31, 33 and 35, the position ambiguity of point 39 can be resolved as illustrated in FIG. 4 utilizing ambiguity loci 32 and 34 to ascertain or resolve position. For more than three emitters, the set of equations (*) are over specified (more equations than unknowns) and the optimum solution can be obtained via a least mean squares (LMS) approach, as described in Widrow, B. and S. Stearns, *Adaptive Signal Processing*, Prentice-Hall, NJ, 1985, Chapter 6.

A key to accurate positioning is the precision time of arrival measurement that can be performed through the use of an ultra wideband, short pulse waveform and a high speed short pulse detector. A suitable UWB transmitter was described in U.S. patent application Ser. No. 08/857,836 by Larrick and Fontana, entitled FREQUENCY ADAPTIVE ULTRA-WIDEBAND TRANSMITTER, filed May 16, 1997, incorporated herein by reference, which describes the design of a low cost, precision UWB waveform generator. A suitable UWB high speed detector is described in above-mentioned U.S. Pat. No. 5,901,172. Because the UWB receiver uses a high speed tunnel diode detector operated in an integrating (charge sensitive) mode, the UWB detector was shown to respond to the leading edge of the received pulse, thereby allowing for improved time-of-flight measurements. In one embodiment, an UWB transceiver would utilize a combination of UWB transmitter and high speed UWB receiver.

The above detailed description illustrate the manner in which an UWB-based system can be used independently, and without the need for additional real-time GPS information, to determine the precise geolocation of a given platform. In this technique, only a priori static coordinate data was used to provide the precision locations of the N fixed UWB transceivers.

It is also possible to use a reduced set of UWB transceivers to augment an existing RTK GPS geolocation system in which one or more GPS receivers are out of service due to loss or degradation of satellite signal(s)—e.g., wartime operation, mining operations near to a vertical mine wall, operation in buildings, urban environments or under dense jungle/forest canopy, etc. In this case, two or more UWB transceivers can be used to provide an additional equation (cf. FIG. 3) which can be incorporated into the RTK ambiguity resolution algorithms. As evident from the description contained herein, the UWB transmitters are self-synchronizing, e.g., providing their own time reference, and do not require GPS timing for operation.

In addition, it has been shown possible to obtain precision timing information through the use of GPS signal carrier-phase. Thus, this precision timing information may also be used to augment an UWB-based precision geolocation system by reducing the short term stability requirements for the oscillators used in the time-of-flight measurements performed at each UWB transceiver site. In this fashion, precision GPS timing may be used to replace or enhance the UWB-based wireless self-synchronization technique described above.

A further hybrid approach is to use a combination of GPS-only RTK augmented with two or more UWB-based transceivers (or transmitters only when GPS timing is available). In this fashion, loss of one or more satellite signals will not result in complete loss of operation. Rather, the UWB-derived positioning information is therefore used to augment the reduced set of equations obtained from the GPS-derived data to reconstruct the correct geolocation.

As a consequence, the system does not require precision, or precision-measured, cables or wiring, thereby significantly reducing the cost of installation and maintenance. Since the units are completely untethered, an optimum configuration for the placement of UWB sensors can be determined without regard to existence of rights-of-way, physical obstructions, etc.

The system has the capability of operating independently of GPS thereby providing operation under conditions in which satellite coverage is unavailable or is blocked by obstructions or shielding (e.g., wartime operation, in buildings, urban environments, under heavy canopy, next to large obstructions such as vertical mine walls, etc.).

The system is useful for augmenting an existing RTK GPS system in the absence of a sufficient number of satellites. Conversely, if precision GPS timing information is available, it can be used to augment the performance of the UWB-based system by providing an alternative to the wireless self-synchronizing timing method.

The proposed invention has immediate and significant application to all areas, both military and commercial, of precision geolocation where centimeter-level positioning needs to be determined over distances of up to several kilometers.

The forgoing is intended to be illustrative of embodiments of systems and methods for attaining precise positioning or object location measurement and in no way limits the scope of the invention defined by the appended claims. For example, even though a processor is shown to be associated with a mobile station for determining the position of an object, such processor may just as well be located at any of the fixed stations or at some other remote location provided the appropriate timing and/or other data is relayed to the location. Rather than employing a cartesian coordinate system to identify spatial points, positions may equivalently be identified using angles and ranges, or other point identification means. A point location may also be resolved with respect to any one of the fixed or mobile points and the system may even be useful in situations where ambiguous points of intersection loci is resolved by other factors, such as topographic conditions. Since determining the position of a point in free space is limited only by the ability to solve a set of equations to determine an unknown, the systems and methods claimed herein embrace those embodiments including any number or combination of fixed points and/or mobile points. Further, processor functionality and time-of-flight measurements at the respective fixed and/or mobile stations may also be interchanged among fixed and mobile points without departing from the scope of the invention. Moreover, the invention has application in any environment that permits the transmission and reception of electromagnetic energy bursts or ultra wideband pulses, such as for measuring or detecting positions of subterranean vehicles, as well as vehicles in free space including earth orbiting and extraterrestrial platforms. Thus, the following claims are intended to embrace all those variations, modifications and departures as may come to those skilled in the art based on the teachings herein.

I claim:

1. A system for determining the position of a remote object with a high degree of accuracy, said system comprising plural untethered stations of known positions, each of said untethered stations having an ultra wideband pulse transmitter, an ultra wideband receiver associated with said remote object, and a processor that uses said known positions of said untethered stations and differences in time of reception of ultra wideband pulses transmitted by at least two of said untethered stations to determine the position of said remote object, said processor further utilizing an ultra wideband sync pulse transmitted from an untethered source as a timing reference for said ultra wideband pulses.

2. A wireless geolocation system for determining the position of a remote object, said system comprising plural untethered stations each having an ultra wideband receiver and transmitter, an ultra wideband pulse receiver associated with said remote object, and a processor that utilizes known position information of said untethered stations, time of arrival information of an ultra wideband sync pulse from an untethered source, and arrival time differences between times of reception at said remote object of ultra wideband pulses transmitted by at least two of said fixed stations in order to determine the position of said remote object.

3. An untethered geolocation system for monitoring the position of a vehicle with a high degree of accuracy, said system comprising at least three untethered stations having predetermined locations, each of said untethered stations having an ultra wideband transmitter, an ultra wideband receiver located at said vehicle, and a processor that determines the location of said vehicle on the basis of time of reception of an ultra wideband sync pulse, the predetermined locations of said untethered stations and time of arrival differences in reception at said vehicle of pulses transmitted by respective pairs of untethered stations.

4. The untethered geolocation system as recited in claim 3 further including coding information in pulse transmissions from said untethered stations indicative of the identity thereof.

5. The untethered geolocation system as recited in claim 3 wherein said ultra wideband sync pulse is transmitted from one of said untethered stations.

6. The untethered geolocation system as recited in claim 3 wherein said processor is located on said vehicle.

7. A method of detecting the position of an object equipped with an ultra wideband transmitter, said method comprising:

provising at least two untethered spatial reference stations of known locations, transmitting an ultra wideband pulse from said object, receiving said ultra wideband pulse at said at least two stations, detecting differences in time of reception of said ultra wideband pulse between said at least two stations, and determining the position of said object according to an ultra wideband time reference pulse, said known locations and said differences in time.

8. A method of detecting the position of an object equipped with an ultra wideband receiver, said method comprising:

providing at least two spatial reference stations of known locations, transmitting in succession an ultra wideband pulse from each of said at least two stations, receiving said ultra wideband pulses at said object, detecting at said object time differences in reception of respective pairs of said ultra wideband pulses transmitted from said at least two stations, and determining the position of said object according to an ultra wideband time reference pulse, said known location of said at least two stations, and said time differences.

9. The method as recited in claim 8, further comprising the step of:

surveying to provide said known locations of said at least two spatial reference stations.

10. The method as recited in claim 8, further comprising the step of:

before said determining step, transmitting said known locations and said time differences to a processor which determines the position of said object.

11. The method as recited in claim 8 further comprising a receiver located at said object, and said method further comprises:

initiating said transmitting step to emit said ultra wideband pulse via a control signal sent to said receiver.

12. A method of detecting the location of an object in an environment that is substantially impervious to conventional radio frequency signals, said method comprising:

providing said object with an ultra wideband transmitter, providing at least two untethered location reference stations, initiating a transmission of an ultra wideband pulse from said transmitter, and detecting the location of said object according to an ultra wideband sync pulse and arrival time differences of a pulse transmitted from said transmitter said at least two untethered location reference stations.

13. A method of locating an object incorporating the steps recited in claim 12, further comprising:

determining the location of said object on the basis of positions of untethered location reference stations and differences between times of arrival of said pulse at said reference locations.

14. A system for detecting the position of an object in an environment that is substantially impervious to conventional electromagnetic signals, said system comprising:

an ultra wideband transmitter associated with said object, an ultra wideband time reference pulse generator, at least two ultra wideband reference stations, and a detector that detects the position of said object according to an ultra wideband timing pulse emitted from said time reference pulse generator and arrival time differences of an ultra wideband pulse from said object at said at least two reference stations.

15. The system for detecting the position of an object as recited in claim 14, further comprising:

a processor that determines the position of said object on the basis of known positions of said reference stations and differences between times of arrival of an ultra wideband pulse from the object at said reference stations.

16. A point location and measurement system comprising at least three spatially located untethered points, an ultra wideband pulse emitted at one of said points, a time-measuring device for measuring times of arrival of said pulse between pairs of any two of three of said points, and a processor for solving a set of equations for determining the position of at least one of said points according to time of arrival measurements, an ultra wideband time reference pulse, and the position of at least one other point.

17. The point location and measurement system as recited in claim 16 wherein transmission of said ultra wideband time reference pulse is initiated at one of said spatially located points to provide synchronization for determining the time-of-flight of an ultra wideband pulse received at another of said spatially located points.

18. A method for determining the position of a point in free space comprising:

providing at least three spatially located untethered points, generating a short burst of electromagnetic energy of a duration that is suitable for achieving a desired measurement resolution, measuring differences between times of arrival of said burst between selected pairs of said three spatially located points, and determining the position of at least one of said points according to time of arrival differences, an ultra wideband time reference pulse, and a known position of at least one other of said spatially located points.

19. The method as recited in claim 18 wherein, in said generating step, said short burst of electromagnetic energy is a ultra wideband pulse.

20. The method as recited in claim 18, further comprising:

determining time-of-flight of said pulses according to a an ultra wideband time reference pulse generated at one of said spatially located points.

21. The method as recited in claim 19, further comprising:

measuring said time-of-flight according to a reference signal selected from one of a GPS source and an timing reference source.

* * * * *